United States Patent
Shou

(10) Patent No.: US 10,464,163 B2
(45) Date of Patent: Nov. 5, 2019

(54) WELDING EQUIPMENT FOR BRIDGES

(71) Applicant: Shanshan Zheng, Jinhua (CN)

(72) Inventor: Jinxiao Shou, Jinhua (CN)

(73) Assignee: Shanshan Zheng, Jinhua, Zhejiang Province (CN)

( * ) Notice: Subject to any disclaimer, the term of this patent is extended or adjusted under 35 U.S.C. 154(b) by 0 days.

(21) Appl. No.: 16/236,359

(22) Filed: Dec. 29, 2018

(65) Prior Publication Data

US 2019/0134740 A1 May 9, 2019

(30) Foreign Application Priority Data

May 16, 2018 (CN) .................. 2018 1 04673687

(51) Int. Cl.
| | | |
|---|---|---|
| *B23K 37/00* | (2006.01) | |
| *B23K 20/00* | (2006.01) | |
| *B23K 37/02* | (2006.01) | |
| *B23K 37/04* | (2006.01) | |
| *B23K 37/047* | (2006.01) | |
| *B23K 31/02* | (2006.01) | |
| *B23K 20/02* | (2006.01) | |
| B23K 101/04 | (2006.01) | |
| B23K 101/22 | (2006.01) | |
| B23K 101/24 | (2006.01) | |

(52) U.S. Cl.
CPC ............ *B23K 20/002* (2013.01); *B23K 20/02* (2013.01); *B23K 31/02* (2013.01);
(Continued)

(58) Field of Classification Search
CPC ...... B23K 20/002; B23K 20/02; B23K 31/02; B23K 37/047; B23K 37/0443;
(Continued)

(56) References Cited

U.S. PATENT DOCUMENTS 4,316,076 A * 2/1982 Balfanz ................ B23K 9/1272
219/124.32
4,939,838 A * 7/1990 Gatta .................... B23P 19/102
29/795
(Continued)

FOREIGN PATENT DOCUMENTS

| CN | 105728973 | 7/2016 |
| CN | 205764656 | 12/2016 |

(Continued)

OTHER PUBLICATIONS

First Office Action for Chinese Counterpart Application 201810467368.7 dated Nov. 14, 2018.

(Continued)

*Primary Examiner* — Kiley S Stoner

(57) ABSTRACT

This invention discloses a welding equipment for bridges, comprising a base, a fixed ring stand arranged on the top end surface of the base, a fixed block fixedly arranged on the bottom end surface of the fixed ring stand, wherein a first guide sliding groove is arranged in the top end surface of the base, a first guide sliding block in sliding fit connection with said first guide sliding groove. A welding ring stand is fixedly connected to the top end surface of said first guide sliding block; wherein a first adjusting threaded rod is in threaded fit connection with the first guide sliding block. A first motor is in power connection with one tail end of the first adjusting threaded rod. The first motor drives the first adjusting threaded rod to rotate to make the welding ring stand move to one side.

3 Claims, 2 Drawing Sheets

(52) U.S. Cl.
CPC ...... *B23K 37/0252* (2013.01); *B23K 37/0276* (2013.01); *B23K 37/047* (2013.01); *B23K 37/0443* (2013.01); *B23K 37/0452* (2013.01); *B23K 2101/04* (2018.08); *B23K 2101/22* (2018.08); *B23K 2101/24* (2018.08)

(58) Field of Classification Search
CPC ............ B23K 37/0276; B23K 37/0252; B23K 37/0452; B23K 2101/24; B23K 2101/22; B23K 2101/04
See application file for complete search history.

(56) References Cited

U.S. PATENT DOCUMENTS

| | | | |
|---|---|---|---|
| 2010/0170050 A1* | 7/2010 | Inose | B23K 9/025 14/73 |
| 2017/0080518 A1* | 3/2017 | Toguyeni | B23K 20/1245 |

FOREIGN PATENT DOCUMENTS

| | | | | |
|---|---|---|---|---|
| CN | 205798765 | | 12/2016 | |
| GB | 547112 A | * | 8/1942 | ............. B23K 5/006 |
| JP | 55-48438 | | 4/1980 | |
| JP | 57-124569 | | 8/1982 | |
| JP | 60056475 A | * | 4/1985 | ............... B23K 9/02 |
| JP | 63123597 A | * | 5/1988 | |
| JP | 01138061 A | * | 5/1989 | |
| JP | 01138062 A | * | 5/1989 | |
| JP | 05220569 A | * | 8/1993 | |
| JP | 2011167692 A | * | 9/2011 | ........... B23K 37/047 |

OTHER PUBLICATIONS

Notification of Grant for Chinese Counterpart Application 201810467368.7 dated Nov. 30, 2018.

* cited by examiner

WELDING EQUIPMENT FOR BRIDGES

CROSS-REFERENCES TO RELATED APPLICATIONS

The present application claims priority from Chinese application No. 2018104673687 filed on May 16, 2018 which is hereby incorporated by reference in its entirety.

TECHNICAL FIELD

The invention relates to the technical field of bridge welding, in particular to a welding equipment for bridges.

BACKGROUND OF THE INVENTION

With the development of science and technology and the progress of society, the country has been promoting the development of high technology. In the technical field of the bridge welding, there has always been a difficult technical problem that a steel reinforcing cage needs to be welded in the general and normal bridge welding constructions, and the welding of the steel reinforcing cage requires the circumferential outer surface and the interior to be welded at the same time, but the ordinary welding machines only weld outside steel reinforcing cages, and the internal welding opening can not be welded. Moreover, it is not easy to adjust the welding diameter of the steel reinforcing cage and not convenient to weld steel reinforcing cages with various diameters, however this device effectively solves the problem.

BRIEF SUMMARY OF THE INVENTION

The technical problem to be solved by the invention is to provide a welding equipment for bridges so as to overcome the problems existing in the prior art.

The invention is adopted by the following technical plan: a welding equipment for bridges in present invention comprises a base, a fixed ring stand arranged on the top end surface of said base, a fixed block fixedly connected with the top end surface of said base arranged on the bottom end surface of said fixed ring stand, wherein a first guide sliding groove with an upward opening and on one end of said fixed block is arranged in the top end surface of said base, a first guide sliding block in sliding fit connection with said first guide sliding groove, a welding ring stand on one end of said fixed ring stand fixedly connected to the top end surface of said first guide sliding block, wherein a first adjusting threaded rod extending towards two ends is in threaded fit connection with the first guide sliding block, a first motor in power connection with one tail end of said first adjusting threaded rod, wherein the outer surface of the first motor is embedded in the inner wall of one end of the first guide sliding groove and is fixedly connected therewith, wherein a second guide sliding block on one end of the first guide sliding block is in sliding fit connection with said first guide sliding groove, a pulling ring stand fixedly connected with the top end surface of said second guide sliding block, wherein a second adjusting threaded rod which is extending towards two ends and on one end of the first adjusting threaded rod is in threaded fit connection with the second guide sliding block, a second motor in power connection with one tail end of the second adjusting threaded rod, wherein the outer surface of the second motor is embedded in the inner wall of the other end of the first guide sliding groove and is fixedly connected therewith, wherein a first guide sliding rod extending towards two ends is in sliding fit connection with the first guide sliding block and the second guide sliding block, wherein tail ends of the first guide sliding rod are fixedly connected with inner walls of the first guide sliding groove, a first circular hole communicating with two sides arranged in the fixed ring stand, a circular groove communicated with the inner wall of the first circular hole, wherein a circular ring is in rotational engagement with said circular groove and the circular ring is internally provided with an annular groove, wherein a third guide sliding groove communicated with the inner cavity of said circular ring is distributed in the circumferential direction and is communicated with one end of said annular groove, a first cavity communicated with the top of the annular groove, a gear in rotational engagement with the annular groove, wherein a third guide sliding block in power connection with the gear is in sliding fit connection with said third guide sliding groove, wherein one end, close to the inner cavity of the circular ring, of the third guide sliding block extends into the circular ring and is provided with a steel bar steeve, a third motor embedded in the inner wall of one end of the first cavity, a first rotating gear for engaging with the gear set on one tail end of the third motor, a fourth motor arranged on the top end surface of the fixed ring stand, wherein one tail end of the fourth motor is in power connection with a second rotating gear, wherein the biggest circumcircle of the second rotating gear extends into the circular groove and engages with the circular ring, a transverse block arranged on the end surface of one end of the fixed ring stand, a welding cylindrical cavity arranged in the welding ring stand, an outer welding device arranged in the inner wall of the welding cylindrical cavity in the circumferential direction, a pulling cylindrical cavity arranged in the pulling ring stand, a rotating disc in rotational engagement with the inner wall of the pulling cylindrical cavity, wherein an impeller which corresponds to the third guide sliding block is arranged in the inner wall of the rotating disc in the circumferential direction, wherein a pushing rod extending into the pulling cylindrical cavity is arranged on the one end, close to the pulling cylindrical cavity, of the impeller, wherein a pulling sleeve corresponding to the steel bar steeve is arranged at one end, close to the center of the pulling cylindrical cavity, of the pushing rod, a positioning recognizer arranged on the end surface of one end of the pulling sleeve, a fixed frame on the one end of the first guide sliding groove arranged on the top end surface of the base, wherein a fifth motor on one end of the center of the first circular hole, the welding cylindrical cavity and the pulling cylindrical cavity is arranged on the end surface of one end of the fixed frame, wherein a third adjusting threaded rod extending towards two ends is in power connection with one tail end of the fifth motor, wherein the extending tail end of one end of the third adjusting threaded rod extends to the outer side of one end of the welding ring stand, an inside welding plate in threaded fit connection with the third adjusting threaded rod, wherein the outer surface of the inside welding plate is provided with an inside welding device which is distributed in the circumferential direction, wherein symmetrical second guide sliding rods extending towards two ends on the upper end and the lower ends of the third adjusting threaded rod are fixedly connected to the end surface of one end of the inside welding plate, wherein one end of the second guide sliding rod penetrates through the fixed frame and is in sliding fit connection with the fixed frame.

As an optimized technical proposal, the transverse block is provided with a communicating feed channel, and a plurality of corresponding rollers are arranged in the upper and lower inner walls of the feed channel, so that the feed resistance becomes small and the feed speed becomes quick.

As an optimized technical proposal, the positioning recognizer is in electric connection with the impeller, so that automatic alignment of the steel bar steeve and the pulling sleeve can be realized to prevent the difference of diameters between the inner wall of two sides of steel reinforcing cage.

The benefits of the invention are as follows: when the equipment in the invention is in an initial state, the third guide sliding block is completely located in the third guide sliding groove, and the steel bar steeve is located at the position which is closest to the inner wall of the circular ring, and the welding ring stand abuts against the transverse block, and the pulling ring stand abuts against the welding ring stand and the inside welding plate is located in the welding cylindrical cavity, and the pulling sleeve and the steel bar steeve are located at the same horizontal line, so the convenience of the device is improved.

When the steel reinforcing cage for the bridge is welded by using the equipment of the invention, the longitudinal steel bars pass through the steel bar sleeve and pass through the welding cylindrical cavity and finally stretch into the pulling sleeve, and the transverse steel bars pass through the feed channel and are connected with the longitudinal steel bars; at the moment, the first motor, the second motor, the fourth motor and the fifth motor are started, and then the first motor drives the first adjusting threaded rod to rotate to make the welding ring stand move to one side, and the second motor drives the second adjusting threaded rod to rotate to enable the pulling ring stand to move to one side, and the fourth motor drives the second rotating gear to rotate to make the circular ring rotate, therefore continuous feed of steel bars of the steel reinforcing cage can be realized; meanwhile, external welding is carried out, and as the fifth motor drives the third adjusting threaded rod to rotate to make the inside welding plate move synchronously with the welding ring stand, so that the inner and outer simultaneous welding of the steel reinforcing cage can be realized, and the welding position also can be repeatedly welded and the welding quality can be improved.

When a steel reinforcing cage with different bore diameters needs to be welded, the third motor is started to drive the first rotating gear to rotate, and the third guide sliding block moves towards the center of the inner cavity of the circular ring under the action of the gear, so that the diameter of the steel reinforcing cage can be reduced; meanwhile, due to the positioning recognizer, the impeller is controlled by the positioning recognizer to enable the pulling sleeve to move towards the interior of the rotating disc until the pulling sleeve corresponds to the steel bar sleeve, so the performance of the device is improved.

The present invention is simple in structure and convenient to operate. The automatic shaping, wall-clamping type welding and automatic aligning and pulling mechanism are adopted, and all the mechanisms are separated from each other but couples with each other closely and not a single one can be omitted. The automation degree, welding quality and protection performance are quite high; meanwhile, the automatic diameter varying device is also arranged, and different series of steel reinforcing cages can be used for welding, so the practical performance is relatively high.

BRIEF DESCRIPTION OF THE DRAWINGS

For better description, the present invention is described in detail by the following specific embodiments and drawings.

DETAILED DESCRIPTION OF THE INVENTION

Figure 1:
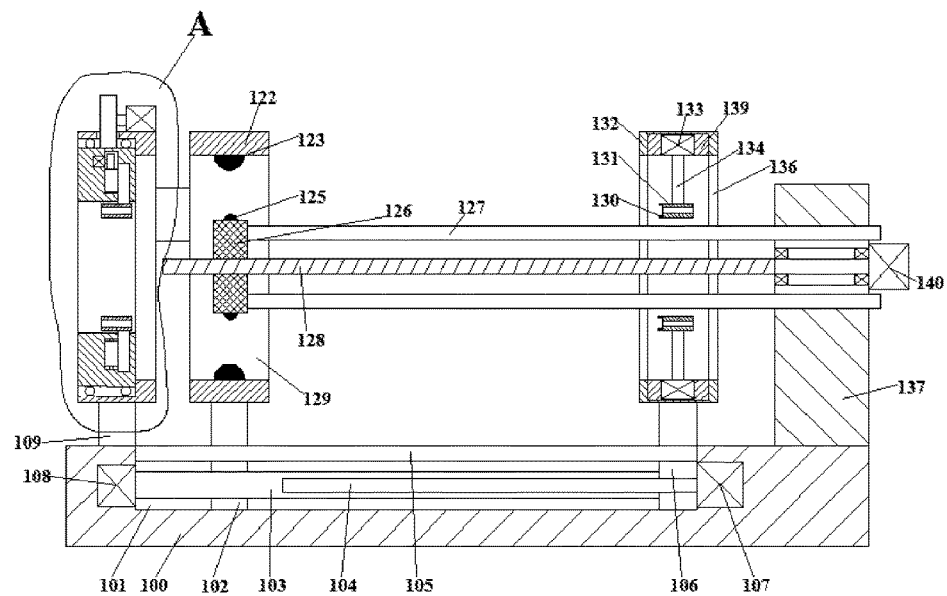
FIG. 1 is the schematic diagram depicting an overall configuration inside a welding equipment for bridges in this invention.
Figure 2:
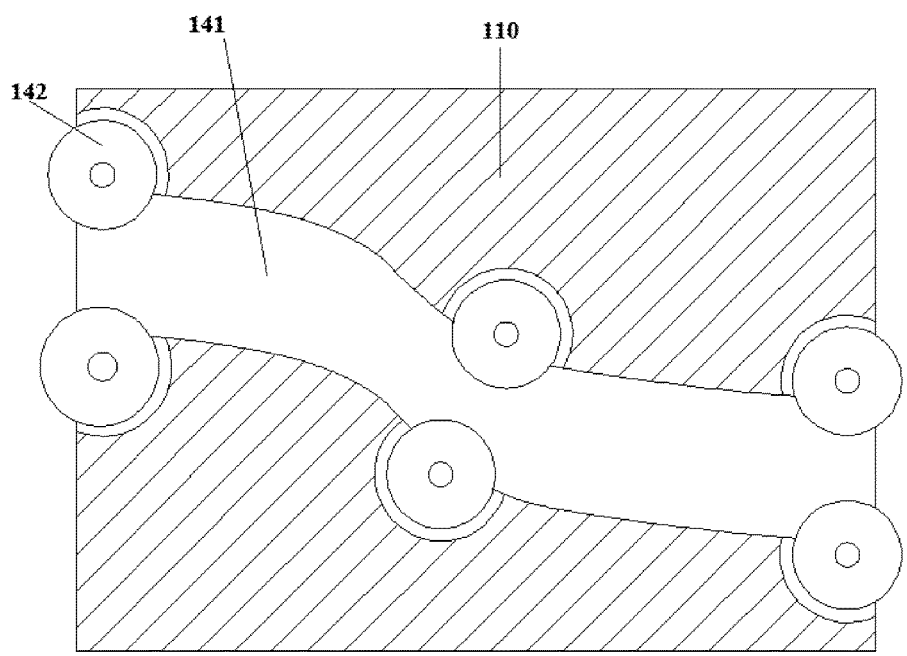
FIG. 2 is a schematic diagram showing the internal structure of a transverse block in this invention.
Figure 3:
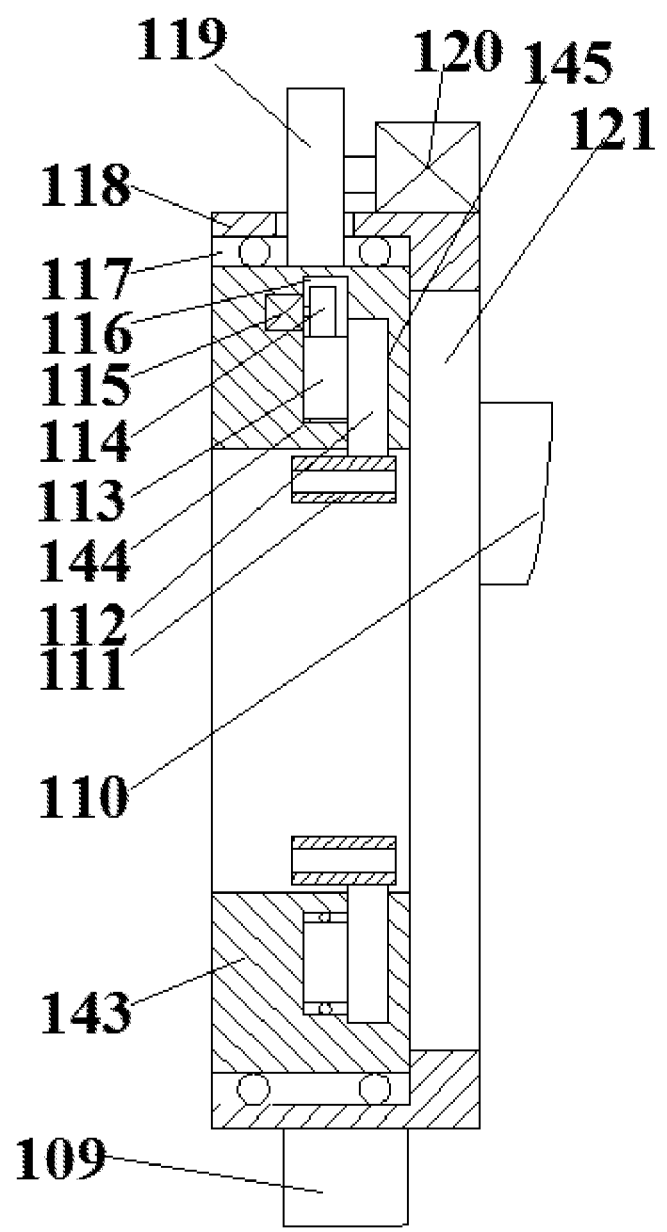
FIG. 3 is a schematic structural diagram of A in FIG. 1.

Referring to FIG. 1 to FIG. 3, a welding equipment for bridges in this invention comprises a base 100, a fixed ring stand 118 arranged on the top end surface of said base 100, a fixed block 109 fixedly connected with the top end surface of said base 100 arranged on the bottom end surface of said fixed ring stand 118, wherein a first guide sliding groove 101 with an upward opening and on one end of said fixed block 109 is arranged in the top end surface of said base 100, a first guide sliding block 102 in sliding fit connection with said first guide sliding groove 101, a welding ring stand 122 on one end of said fixed ring stand 118 fixedly connected to the top end surface of said first guide sliding block 102, wherein a first adjusting threaded rod 103 extending towards two ends is in threaded fit connection with the first guide sliding block 102, a first motor 108 in power connection with one tail end of said first adjusting threaded rod 103, wherein the outer surface of the first motor 108 is embedded in the inner wall of one end of the first guide sliding groove 101 and is fixedly connected therewith, wherein a second guide sliding block 106 on one end of the first guide sliding block 102 is in sliding fit connection with said first guide sliding groove 101, a pulling ring stand 132 fixedly connected with the top end surface of said second guide sliding block 106, wherein a second adjusting threaded rod 104 which is extending towards two ends and on one end of the first adjusting threaded rod 103 is in threaded fit connection with the second guide sliding block 106, a second motor 107 in power connection with one tail end of the second adjusting threaded rod 104, wherein the outer surface of the second motor 107 is embedded in the inner wall of the other end of the first guide sliding groove 101 and is fixedly connected therewith, wherein a first guide sliding rod 105 extending towards two ends is in sliding fit connection with the first guide sliding block 102 and the second guide sliding block 106, wherein tail ends of the first guide sliding rod 105 are fixedly connected with inner walls of the first guide sliding groove 101, a first circular hole 121 communicating with two sides arranged in the fixed ring stand 118, a circular groove 117 communicated with the inner wall of the first circular hole 121, wherein a circular ring 143 is in rotational engagement with said circular groove 117 and the circular ring 143 is internally provided with an annular groove 144, wherein a third guide sliding groove 145 communicated with the inner cavity of said circular ring 143 is distributed in the circumferential direction and is communicated with one end of said annular groove 144, a first cavity 116 communicated with the top of the annular groove 144, a gear 113 in rotational engagement with the annular groove 144, wherein a third guide sliding block 112 in power connection with the gear 113 is in sliding fit connection with said third guide sliding groove 145, wherein one end, close to the inner cavity of the circular ring 143, of the third guide sliding block 112 extends into the circular ring 143 and is provided with a steel bar steeve 111, a third motor 115 embedded in the inner wall of one end of the first cavity 116, a first rotating gear 114 for engaging with the gear 113 set on one tail end of the third motor 115, a fourth motor 120 arranged on the top end surface of the fixed ring stand 118, wherein one tail end of the fourth motor 120 is in power connection with a second rotating gear 119, wherein the biggest circumcircle of the second rotating gear 119 extends into the circular groove 117 and engages with the circular ring 143, a transverse block 110 arranged on the end surface of one end of the fixed ring stand 118, a welding cylindrical cavity 129 arranged in the welding ring stand 122, an outer welding device 123 arranged in the inner wall of the welding cylindrical cavity 129 in the circumferential direction, a pulling cylindrical cavity 136 arranged in the pulling ring stand 132, a rotating disc 139 in rotational engagement with the inner wall of the pulling cylindrical cavity 136, wherein an impeller 133 which corresponds to the third guide sliding block 112 is arranged in the inner wall of the rotating disc 139 in the circumferential direction, wherein a pushing rod 134 extending into the pulling cylindrical cavity 136 is arranged on the one end, close to the pulling cylindrical cavity 136, of the impeller 133, wherein a pulling sleeve 131 corresponding to the steel bar steeve 111 is arranged at one end, close to the center of the pulling cylindrical cavity 136, of the pushing rod 134, a positioning recognizer 130 arranged on the end surface of one end of the pulling sleeve 131, a fixed frame 137 on the one end of the first guide sliding groove 101 arranged on the top end surface of the base 100, wherein a fifth motor 140 on one end of the center of the first circular hole 121, the welding cylindrical cavity 129 and the cylindrical cavity 136 is arranged on the end surface of one end of the fixed frame 137, wherein a third adjusting threaded rod 128 extending towards two ends is in power connection with one tail end of the fifth motor 140, wherein the extending tail end of one end of the third adjusting threaded rod 128 extends to the outer side of one end of the welding ring stand 122, an inside welding plate 126 in threaded fit connection with the third adjusting threaded rod 128, wherein the outer surface of the inside welding plate 126 is provided with an inside welding device 125 which is distributed in the circumferential direction, wherein symmetrical second guide sliding rods 127 extending towards two ends on the upper end and the lower ends of the third adjusting threaded rod 128 are fixedly connected to the end surface of one end of the inside welding plate 126, wherein one end of the second guide sliding rod 127 penetrates through the fixed frame 137 and is in sliding fit connection with the fixed frame 137.

Beneficially, the transverse block 110 is provided with a communicating feed channel 141, and a plurality of corresponding rollers 142 are arranged in the upper and lower inner walls of the feed channel 141, so that the feed resistance becomes small and the feed speed becomes quick.

Beneficially, the positioning recognizer 130 is in electric connection with the impeller 133, so that automatic alignment of the steel bar steeve 111 and the pulling sleeve 131 can be realized to prevent the difference of diameters between the inner wall of two sides of steel reinforcing cage.

When the equipment in the invention is in an initial state, the third guide sliding block 112 is completely located in the third guide sliding groove 145, and the steel bar steeve 111 is located at the position which is closest to the inner wall of the circular ring 143, and the welding ring stand 122 abuts against the transverse block 110, and the pulling ring stand 132 abuts against the welding ring stand 122 and the inside welding plate 126 is located in the welding cylindrical cavity 129, and the pulling sleeve 131 and the steel bar steeve 111 are located at the same horizontal line.

When the steel reinforcing cage for the bridge is welded by using the equipment of the invention, the longitudinal steel bars pass through the steel bar sleeve 111 and pass through the welding cylindrical cavity 129 and finally stretch into the pulling sleeve 131, and the transverse steel bars pass through the feed channel 141 and are connected with the longitudinal steel bars; at the moment, the first motor 108, the second motor 107, the fourth motor 120 and the fifth motor 140 are started, and then the first motor 108 drives the first adjusting threaded rod 103 to rotate to make the welding ring stand 122 move to one side, and the second motor 107 drives the second adjusting threaded rod 104 to rotate to enable the pulling ring stand 132 to move to one side, and the fourth motor 120 drives the second rotating gear 119 to rotate to make the circular ring 143 rotate, therefore continuous feed of steel bars of the steel reinforcing cage can be realized; meanwhile, external welding is carried out, and as the fifth motor 140 drives the third adjusting threaded rod 128 to rotate to make the inside welding plate 126 move synchronously with the welding ring stand 122, so that the inner and outer simultaneous welding of the steel reinforcing cage can be realized, and the welding position also can be repeatedly welded and the welding quality can be improved.

When a steel reinforcing cage with different bore diameters needs to be welded, the third motor 115 is started to drive the first rotating gear 114 to rotate, and the third guide sliding block 112 moves towards the center of the inner cavity of the circular ring 143 under the action of the gear 113, so that the diameter of the steel reinforcing cage can be reduced; meanwhile, due to the positioning recognizer 130, the impeller 133 is controlled by the positioning recognizer 130 to enable the pulling sleeve 131 to move towards the interior of the rotating disc 139 until the pulling sleeve 131 corresponds to the steel bar sleeve 111.

The benefits of the invention are as follows: when the equipment in the invention is in an initial state, the third guide sliding block is completely located in the third guide sliding groove, and the steel bar steeve is located at the position which is closest to the inner wall of the circular ring, and the welding ring stand abuts against the transverse block, and the pulling ring stand abuts against the welding ring stand and the inside welding plate is located in the welding cylindrical cavity, and the pulling sleeve and the steel bar steeve are located at the same horizontal line, so the convenience of the device is improved.

When the steel reinforcing cage for the bridge is welded by using the equipment of the invention, the longitudinal steel bars pass through the steel bar sleeve and pass through the welding cylindrical cavity and finally stretch into the pulling sleeve, and the transverse steel bars pass through the feed channel and are connected with the longitudinal steel bars; at the moment, the first motor, the second motor, the fourth motor and the fifth motor are started, and then the first motor drives the first adjusting threaded rod to rotate to make the welding ring stand move to one side, and the second motor drives the second adjusting threaded rod to rotate to enable the pulling ring stand to move to one side, and the fourth motor drives the second rotating gear to rotate to make the circular ring rotate, therefore continuous feed of steel bars of the steel reinforcing cage can be realized; meanwhile, external welding is carried out, and as the fifth motor drives the third adjusting threaded rod to rotate to make the inside welding plate move synchronously with the welding ring stand, so that the inner and outer simultaneous welding of the steel reinforcing cage can be realized, and the welding position also can be repeatedly welded and the welding quality can be improved.

When a steel reinforcing cage with different bore diameters needs to be welded, the third motor is started to drive the first rotating gear to rotate, and the third guide sliding block moves towards the center of the inner cavity of the circular ring under the action of the gear, so that the diameter of the steel reinforcing cage can be reduced; meanwhile, due to the positioning recognizer, the impeller is controlled by the positioning recognizer to enable the pulling sleeve to move towards the interior of the rotating disc until the pulling sleeve corresponds to the steel bar sleeve, so the performance of the device is improved.

The present invention is simple in structure and convenient to operate. The automatic shaping, wall-clamping type welding and automatic aligning and pulling mechanism are adopted, and all the mechanisms are separated from each other but couples with each other closely and not a single one can be omitted. The automation degree, welding quality and protection performance are quite high; meanwhile, the automatic diameter varying device is also arranged, and different series of steel reinforcing cages can be used for welding, so the practical performance is relatively high.

The above is only the specific embodiment of the present invention, but the protection scope of the present invention is not limited thereto, and any changes or substitutions without creative efforts shall fall within the protection scope of the present invention. Therefore, the claimed protection extent of the invention shall be determined with reference to the appended claims.

The invention claimed is:

1. A welding equipment for bridges, comprising
a base;
a fixed ring stand arranged on a top end surface of said base;
a fixed block fixedly connected with the top end surface of said base arranged on a bottom end surface of said fixed ring stand;
wherein a first guide sliding groove with an upward opening and on one end of said fixed block is arranged in the top end surface of said base;
a first guide sliding block in sliding fit connection with said first guide sliding groove;
a welding ring stand on one end of said fixed ring stand fixedly connected to a top end surface of said first guide sliding block;
wherein a first adjusting threaded rod extending towards two ends is in threaded fit connection with the first guide sliding block;
a first motor in power connection with one tail end of said first adjusting threaded rod;
wherein an outer surface of the first motor is embedded in an inner wall of one end of the first guide sliding groove and is fixedly connected therewith;
wherein a second guide sliding block on one end of the first guide sliding block is in sliding fit connection with said first guide sliding groove;
a pulling ring stand fixedly connected with a top end surface of said second guide sliding block;
wherein a second adjusting threaded rod which is extending towards two ends and on one end of the first adjusting threaded rod is in threaded fit connection with the second guide sliding block;
a second motor in power connection with one tail end of the second adjusting threaded rod;
wherein an outer surface of the second motor is embedded in an inner wall of the other end of the first guide sliding groove and is fixedly connected therewith;
wherein a first guide sliding rod extending towards two ends is in sliding fit connection with the first guide sliding block and the second guide sliding block;
wherein tail ends of the first guide sliding rod are fixedly connected with inner walls of the first guide sliding groove;
a first circular hole communicating with two sides arranged in the fixed ring stand;
a circular groove communicated with an inner wall of the first circular hole;
wherein a circular ring is in rotational engagement with said circular groove and the circular ring is internally provided with an annular groove;
wherein a third guide sliding groove communicated with the inner cavity of said circular ring is distributed in the circumferential direction and is communicated with one end of said annular groove;
a first cavity communicated with a top of the annular groove;
a gear in rotational engagement with the annular groove;
wherein a third guide sliding block in power connection with the gear is in sliding fit connection with said third guide sliding groove;
wherein one end, close to the inner cavity of the circular ring, of the third guide sliding block extends into the circular ring and is provided with a steel bar steeve;
a third motor embedded in an inner wall of one end of the first cavity;
a first rotating gear for engaging with the gear set on one tail end of the third motor;
a fourth motor arranged on a top end surface of the fixed ring stand;
wherein one tail end of the fourth motor is in power connection with a second rotating gear;
wherein the biggest circumcircle of the second rotating gear extends into the circular groove and engages with the circular ring;
a transverse block arranged on an end surface of one end of the fixed ring stand;
a welding cylindrical cavity arranged in the welding ring stand;
an outer welding device arranged in an inner wall of the welding cylindrical cavity in the circumferential direction;
a pulling cylindrical cavity arranged in the pulling ring stand;
a rotating disc in rotational engagement with an inner wall of the pulling cylindrical cavity;
wherein an impeller which corresponds to the third guide sliding block is arranged in an inner wall of the rotating disc in the circumferential direction;
wherein a pushing rod extending into the pulling cylindrical cavity is arranged on the one end, close to the pulling cylindrical cavity, of the impeller;
wherein a pulling sleeve corresponding to the steel bar steeve is arranged at one end, close to the center of the pulling cylindrical cavity, of the pushing rod;
a positioning recognizer arranged on an end surface of one end of the pulling sleeve;
a fixed frame on the one end of the first guide sliding groove arranged on the top end surface of the base;
wherein a fifth motor on one end of the center of the first circular hole, the welding cylindrical cavity and the pulling cylindrical cavity is arranged on an end surface of one end of the fixed frame;

wherein a third adjusting threaded rod extending towards two ends is in power connection with one tail end of the fifth motor;

wherein an one end extending tail of the third adjusting threaded rod extends to an outer side of one end of the welding ring stand;

an inside welding plate in threaded fit connection with the third adjusting threaded rod;

wherein an outer surface of the inside welding plate is provided with an inside welding device which is distributed in the circumferential direction;

wherein symmetrical second guide sliding rods extending towards two ends on an upper end and a lower end of the third adjusting threaded rod are fixedly connected to an end surface of one end of the inside welding plate;

wherein one end of the second guide sliding rod penetrates through the fixed frame and is in sliding fit connection with the fixed frame;

wherein the first motor, the second motor, the fourth motor and the fifth motor are started, and then the first motor drives the first adjusting threaded rod to rotate to make the welding ring stand move to one side, and the second motor drives the second adjusting threaded rod to rotate to enable the pulling ring stand to move to one side, and the fourth motor drives the second rotating gear to rotate to make the circular ring rotate;

wherein continuous feed of steel bars of the steel reinforcing cage can be realized; meanwhile, external welding is carried out, and as the fifth motor drives the third adjusting threaded rod to rotate to make the inside welding plate move synchronously with the welding ring stand, so that the inner and outer simultaneous welding of the steel reinforcing cage can be realized.

2. The welding equipment for bridges according to claim 1, wherein said transverse block is provided with a communicating feed channel;

a plurality of corresponding rollers are arranged in an upper and a lower inner wall of the feed channel, so that the feed resistance becomes small with the help of a plurality of rollers and the feed speed becomes quick;

the longitudinal steel bars pass through the steel bar sleeve and pass through the welding cylindrical cavity and finally stretch into the pulling sleeve, and the transverse steel bars pass through the feed channel and are connected with the longitudinal steel bars.

3. The welding equipment for bridges according to claim 1, wherein said positioning recognizer is in electric connection with the impeller, so that automatic alignment of the steel bar steeve and the pulling sleeve can be realized to prevent the difference of diameters between inner walls of two sides of steel reinforcing cage;

wherein the impeller is controlled by the positioning recognizer to enable the pulling sleeve to move towards an interior of the rotating disc until the pulling sleeve corresponds to the steel bar sleeve.

* * * * *